H. QUEGWER.
REVERSING MECHANISM FOR HARVESTING MACHINES.
APPLICATION FILED JULY 31, 1913.
1,129,727.
Patented Feb. 23, 1915.
3 SHEETS—SHEET 2.
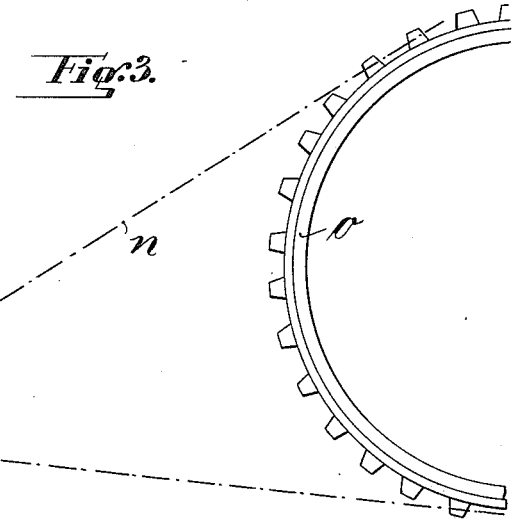
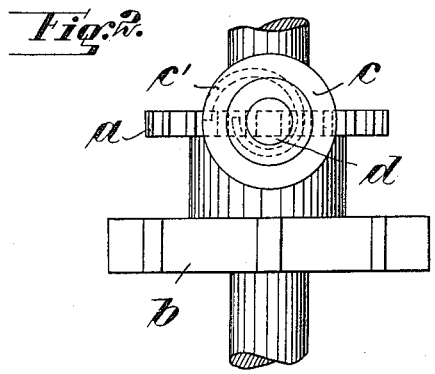
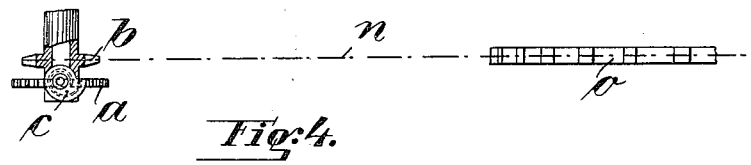
WITNESSES
INVENTOR
HERMANN QUEGWER
BY
ATTORNEYS H. QUEGWER.
REVERSING MECHANISM FOR HARVESTING MACHINES.
APPLICATION FILED JULY 31, 1913.
1,129,727.
Patented Feb. 23, 1915.
3 SHEETS—SHEET 3.
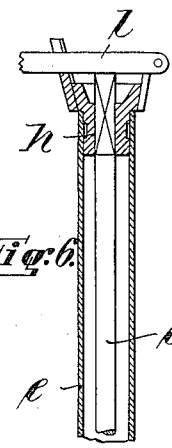
Fig. 6.
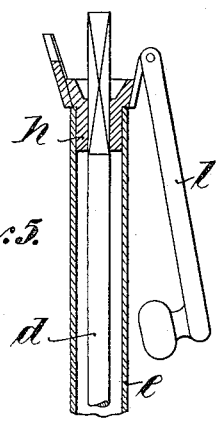
Fig. 5.
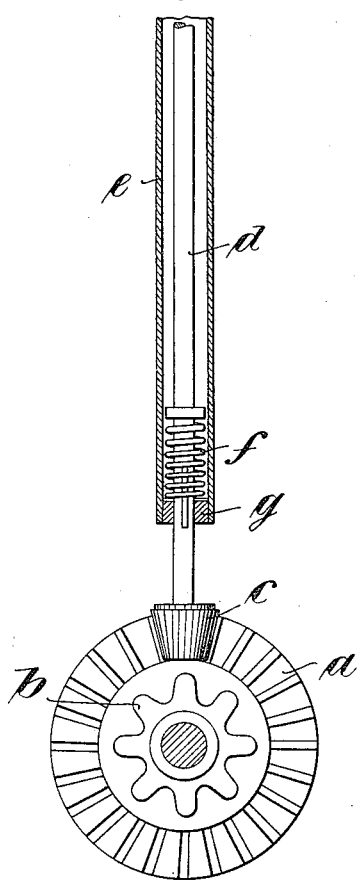
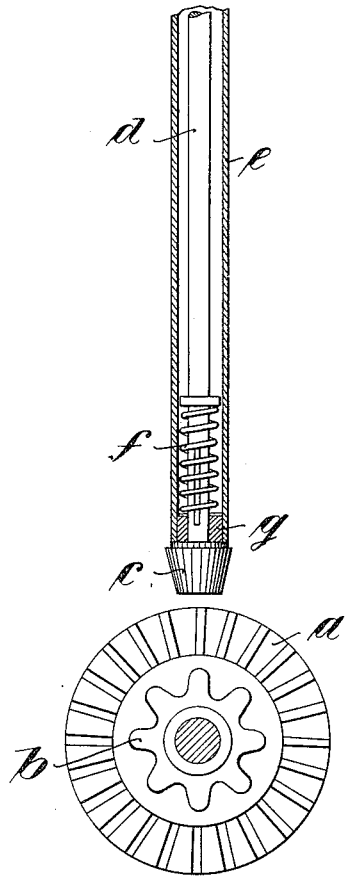
WITNESSES
W. C. Baker, Jr.
INVENTOR
HERMANN QUEGWER
BY
ATTORNEYS

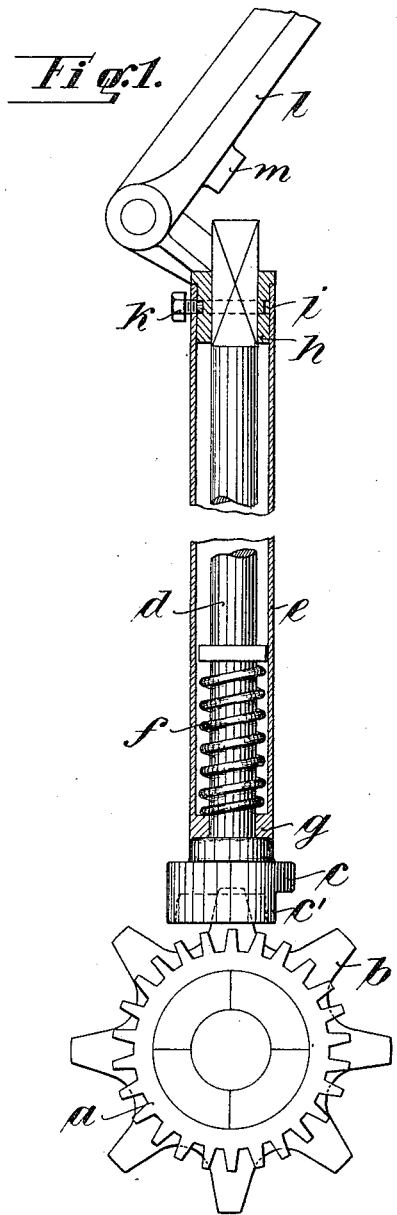

UNITED STATES PATENT OFFICE.

HERMANN QUEGWER, OF BUNZLAU, GERMANY.

REVERSING MECHANISM FOR HARVESTING-MACHINES.

1,129,727.

Specification of Letters Patent. Patented Feb. 23, 1915.

Application filed July 31, 1913. Serial No. 782,249.

*To all whom it may concern:*

Be it known that I, HERMANN QUEGWER, a subject of the King of Prussia, residing at Bunzlau, Silesia, in the Kingdom of Prussia and German Empire, have invented a new and useful Improved Reversing Mechanism for Harvesting-Machines, of which the following is a specification.

In the machine forming the subject-matter of the present invention a spur-wheel, pin-wheel, bevel-wheel or the like, connected with the driving wheel by a chain gear, is driven by a machine element (preferably a worm or bevel wheel) which is fixed on an auxiliary movable shaft. To this shaft a crank is hinged, by means of which the shaft, and, therefore, also the machine element, can be simultaneously turned, and, on pressing down said crank, brought into engagement with the spur-wheel or the like connected with the driving wheel. As soon as the crank is released, the shaft is raised again by a spring and the machine element thus moved out of engagement with the spur-wheel or the like.

The advantage of the device consists in the fact that by the application of a comparatively small amount of force applied near the seat the mowing or harvesting machine can be run backward from the driver's seat and in the automatic release effected before the machine commences its forward motion thus preventing the parts from being broken.

In the drawings Figure 1 is a sectional side elevation of my improvement. Fig. 2 is a plan view of a portion of same. Fig. 3 is a side elevation showing connections with a mowing machine drive wheel. Fig. 4 is a sectional plan view of Fig. 3. Figs. 5 and 6 are sectional elevations of a modified form in a position of rest and of use, respectively.

$a$ (Figs 1–4) is a spur-wheel connected with the chain wheel $b$, which spur-wheel is to be turned by a spiral thread $c^1$. The disk $c$ carrying said spiral thread $c^1$ is secured to the shaft $d$, which is adapted to be moved longitudinally in the pipe $e$, being commonly kept in a raised position by the spring $f$. The shaft $d$ is journaled in the pipe $e$ at $g$ and $h$. Preferably the lower bearing or guide ring $g$ is welded into the pipe $e$, while the upper ring $h$ fits on the top rectangular end of said shaft $d$ and turns in the casing or sleeve $e$, a longitudinal motion being prevented by the set screw $k$ projecting into the groove $i$. To the ring $h$ a pin is secured, on which one end of the crank $l$ is hinged. This crank has a projection $m$, which, on turning down said crank, presses on the top end of the shaft $d$ and moves said shaft against the pressure of the spring $f$ so far downward, that the spiral thread $c^1$ comes into engagement with the spur-wheel $a$. By turning the crank $l$ the shaft $d$ and disk $c$ are likewise turned, so that the spur-wheel $a$ is driven with a corresponding purchase. On releasing the crank $l$ the shaft $d$ is raised by the spring $f$, so that, when the machine is moved forward, said spur-wheel $a$ can turn in the opposite direction to that in which it previously turned.

In the construction shown in Figs. 5 and 6 a bevel wheel $a$ is secured to the chain-wheel $b$, which drives the main wheel $o$ of the machine by a chain in known manner. A second bevel wheel $c$ is fastened to the shaft $d$, which, as in the construction shown in Figs. 1–4, is adapted to be moved longitudinally. By axial movement of this shaft the bevel wheel $c$ will be brought into engagement with the bevel wheel $a$, normally, however, the wheel $c$ is held by the spring $f$ in the disengaged position. In this construction also the shaft $d$ is turned by a crank $l$, which, in the position of rest (Fig. 1), hangs inoperative, while on turning the crank $l$ into the position shown in Fig. 6 said crank presses down the shaft $d$, so that the bevel wheel $c$ comes into engagement with the wheel $a$. On again releasing the crank $l$ the shaft $d$ will be raised automatically by the spring $f$ and consequently the bevel wheels will be moved out of engagement.

What I claim and desire to secure by Letters Patent of the United States is:—

1. The herein described reversing mechanism comprising in combination, a rotary machine element adapted to be secured to the driving gear of a harvesting machine, a shaft, a rotary machine element carried thereby, a stationary member supporting the shaft, and means rotatably carried by the stationary member to impart an axial and rotary motion to said shaft.

2. The herein described reversing mechanism comprising in combination a machine element adapted to be secured to the driving gear of a harvester, a shaft, a machine element carried thereby, a stationary member supporting said shaft, and means rotatably carried by said stationary member to impart an axial and rotary motion to said shaft.

3. The herein described reversing mechanism comprising in combination, a machine element adapted to be secured to the driving gear of a harvester, a shaft, a casing carrying said shaft, a machine element secured to said shaft, and means swiveled in said casing for engaging said shaft and imparting thereto a longitudinal and rotary movement whereby the aforesaid machine elements may be brought into contact.

4. The described reversing mechanism, comprising in combination, a machine element adapted to be secured to the driving gear of a harvesting machine, a shaft adapted to be turned and moved longitudinally, a machine element secured to said shaft, a casing inclosing said shaft, and a crank adapted to engage said shaft and be turned in said casing and thus to turn said shaft, substantially as, and for the purpose, set forth.

5. The herein described reversing mechanism comprising in combination a gear wheel adapted to be secured to the driving gear of a harvesting machine, a shaft, a gear wheel carried at one end of said shaft, a stationary support for said casing, and a pivoted crank swiveled in said support at the opposite end of the shaft, whereby a rotary and longitudinal motion may be imparted to the shaft to cause the aforesaid gear wheels to mesh.

6. The herein described reversing mechanism, comprising in combination a pinion adapted to be secured to the driving chain wheel of a mowing or harvesting machine, a shaft adapted to be moved longitudinally and rotated, a casing inclosing said shaft, a crank arm rotatably mounted in said casing and pivoted therein whereby it is adapted to be swung into engagement with the aforesaid shaft, a spring within said casing and controlling said shaft, a spiral worm secured to the lower end of the shaft and adapted for engagement with the spur wheel on the sprocket chain shaft.

7. The herein described reversing mechanism for moving a mowing or harvesting machine backward, comprising in combination, a spur wheel adapted to be secured to the chain wheel shaft of a mowing or harvesting machine, a shaft adapted to be moved longitudinally and rotated, a casing inclosing said shaft, a collar fitting the upper end of the shaft and rotatably held in the casing, a crank arm pivotally mounted on said collar and adapted to engage the upper end of the aforesaid shaft to cause longitudinal and rotary movement of the same, and a spiral worm wheel on the lower end of the shaft adapted to engage the spur wheel on the chain wheel shaft.

8. In a reversing mechanism, the combination with a gear wheel adapted to be secured to the driving gear of a harvesting machine, a shaft, a gear wheel carried at one end of said shaft, a casing inclosing said shaft, a collar swiveled in said casing and slidably supporting the opposite end of said shaft, a crank pivoted to said collar at one side, and a projection at the opposite side of said collar adapted to be engaged by said crank whereby the shaft may be moved longitudinally and rotated by said crank.

In testimony whereof I have signed my name to this specification in the presence of two subscribing witnesses.

HERMANN QUEGWER.

Witnesses:
 HUGO SCHWARZBACH,
 GEORG BEYER.

Copies of this patent may be obtained for five cents each, by addressing the "Commissioner of Patents, Washington, D. C."